Aug. 23, 1966  R. C. SPOONER  3,267,928
HEATER
Filed Jan. 15, 1964  7 Sheets-Sheet 1
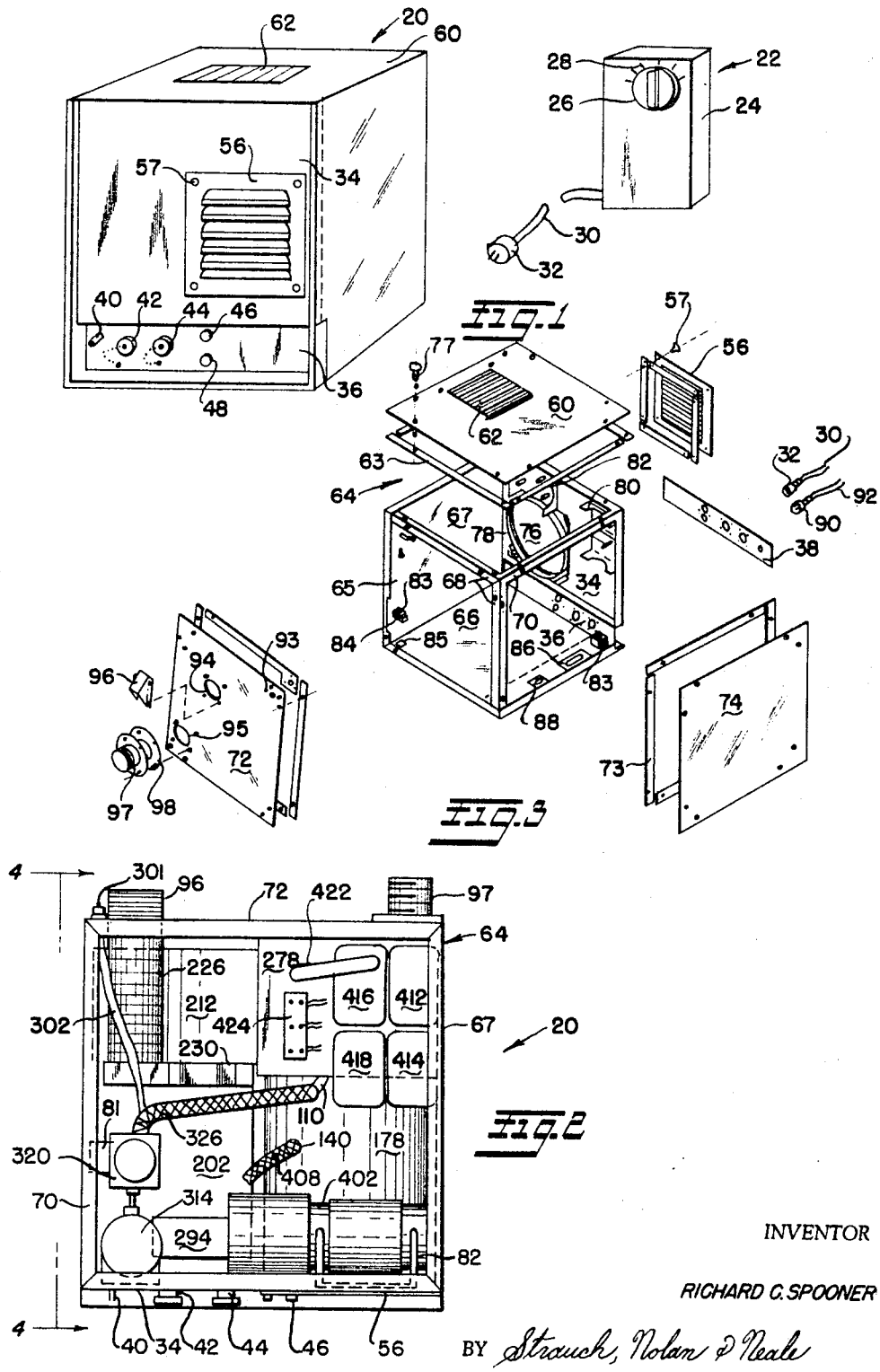
INVENTOR
RICHARD C. SPOONER
BY Strauch, Nolan & Neale
ATTORNEYS

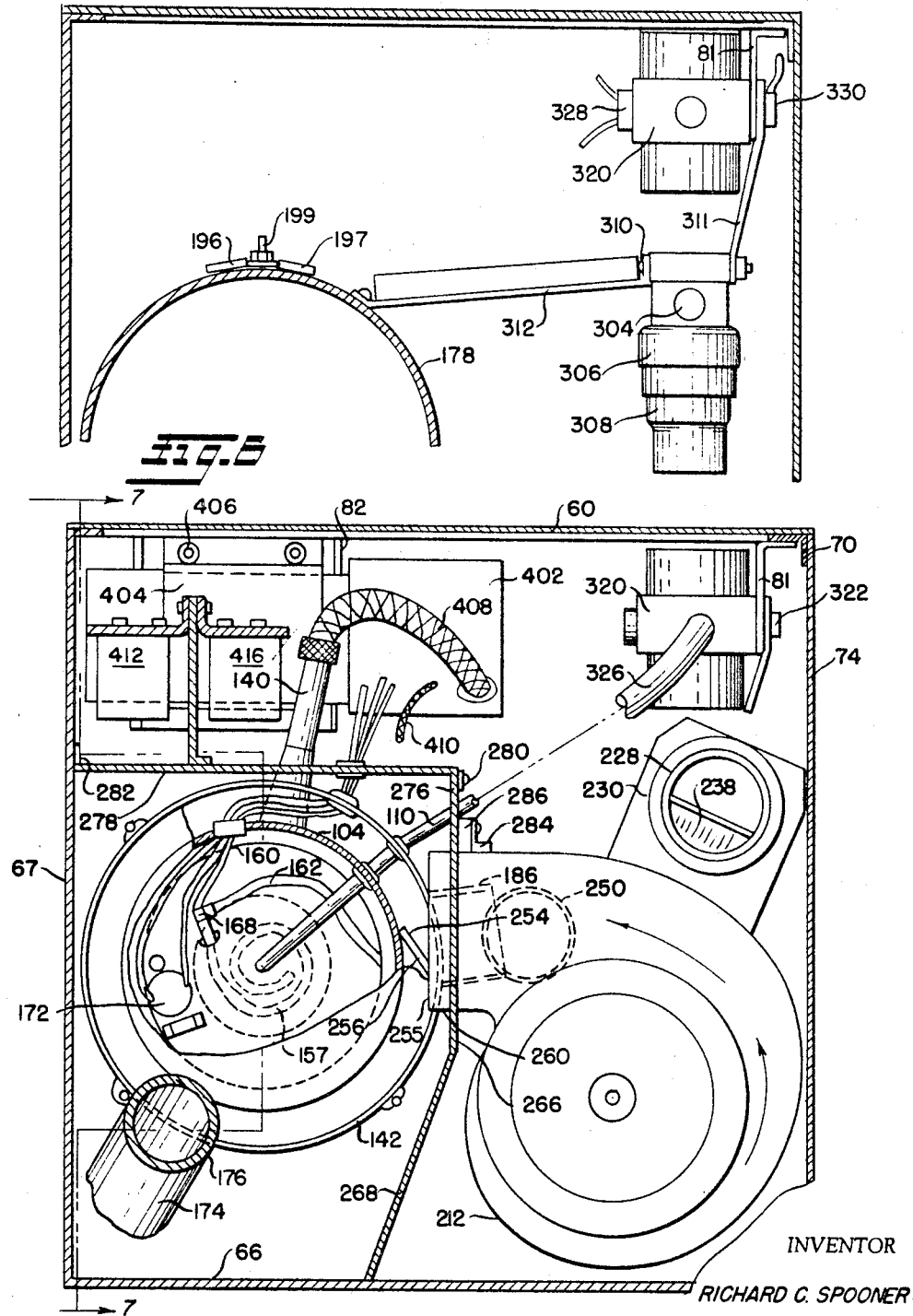

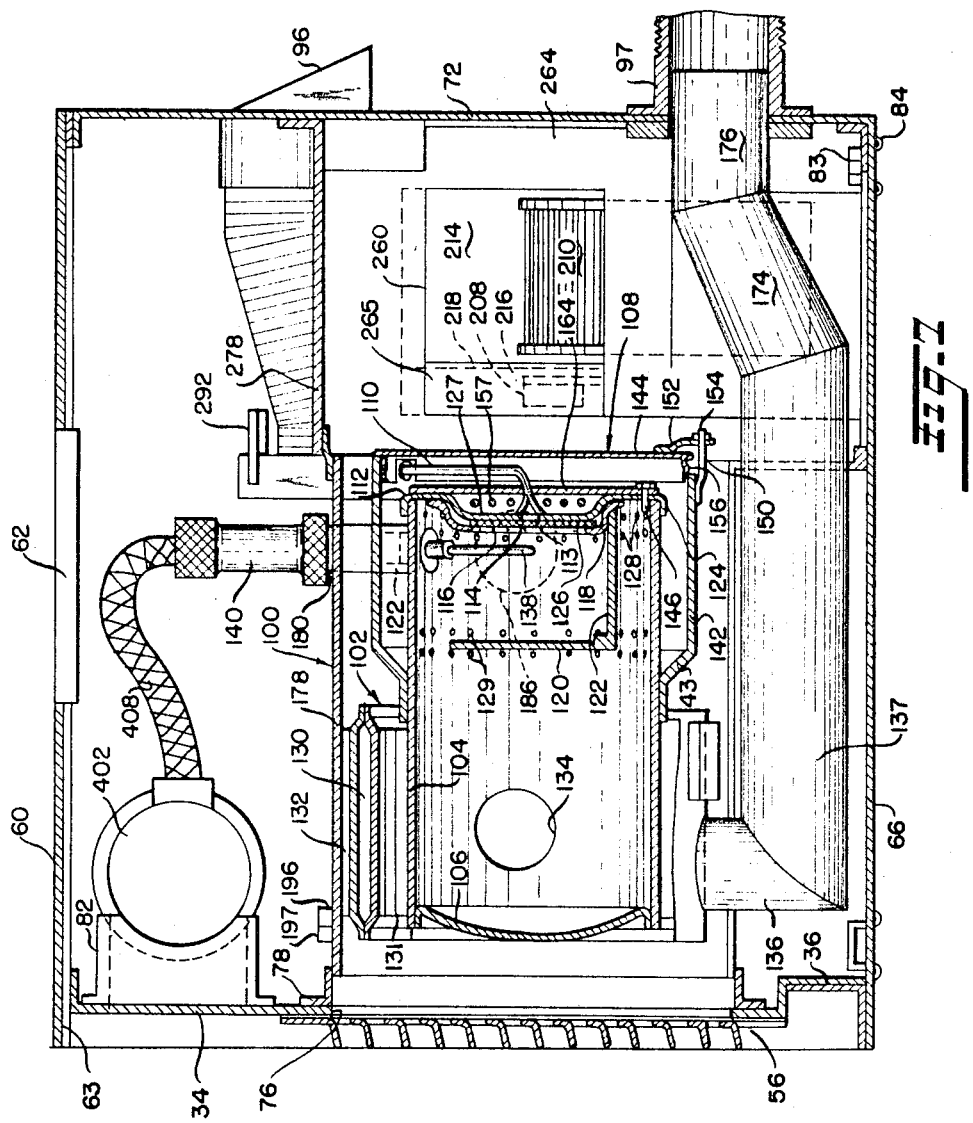

Aug. 23, 1966  R. C. SPOONER  3,267,928
HEATER
Filed Jan. 15, 1964  7 Sheets-Sheet 5

INVENTOR
RICHARD C. SPOONER
BY Strauch, Nolan & Neale
ATTORNEYS

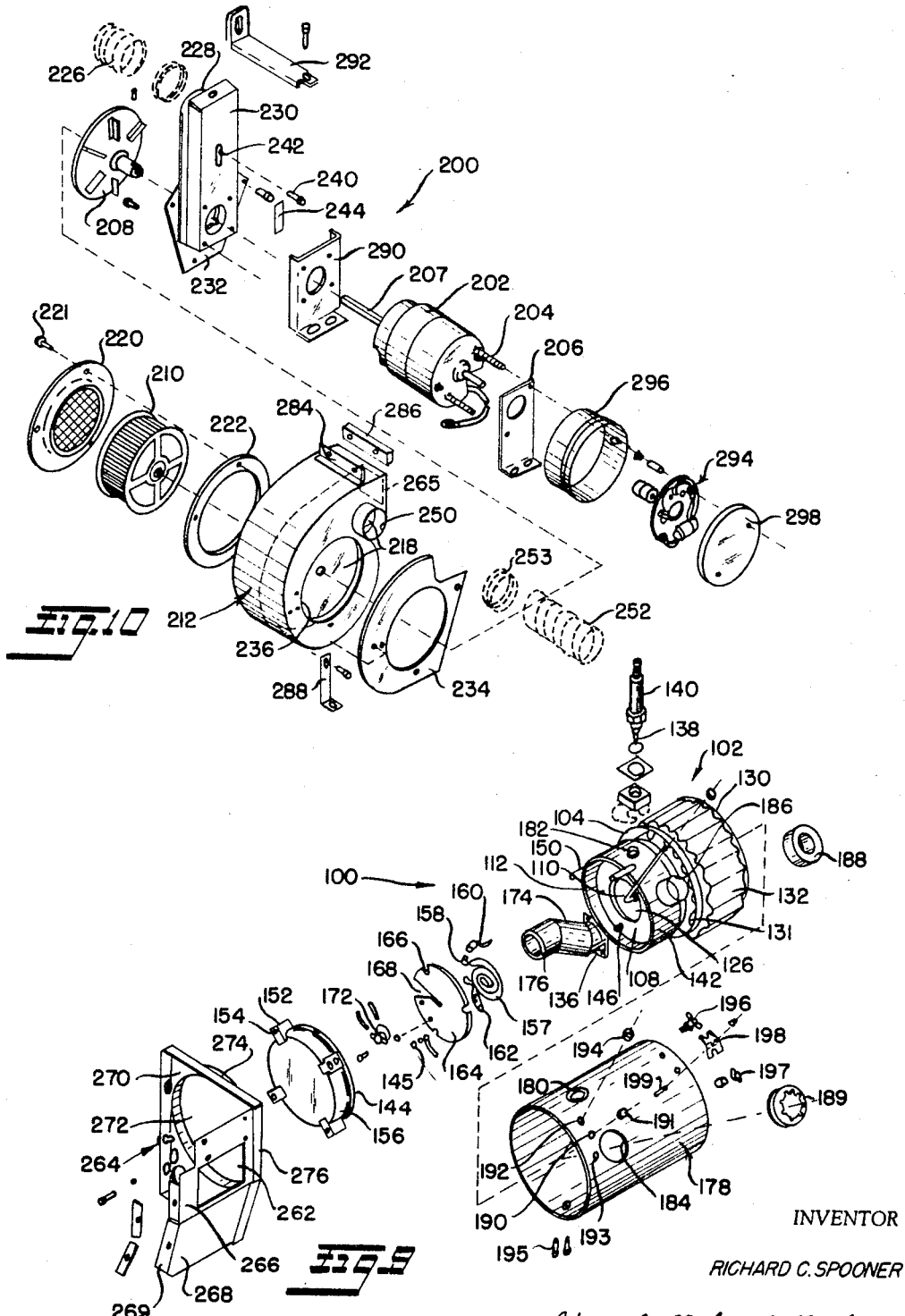

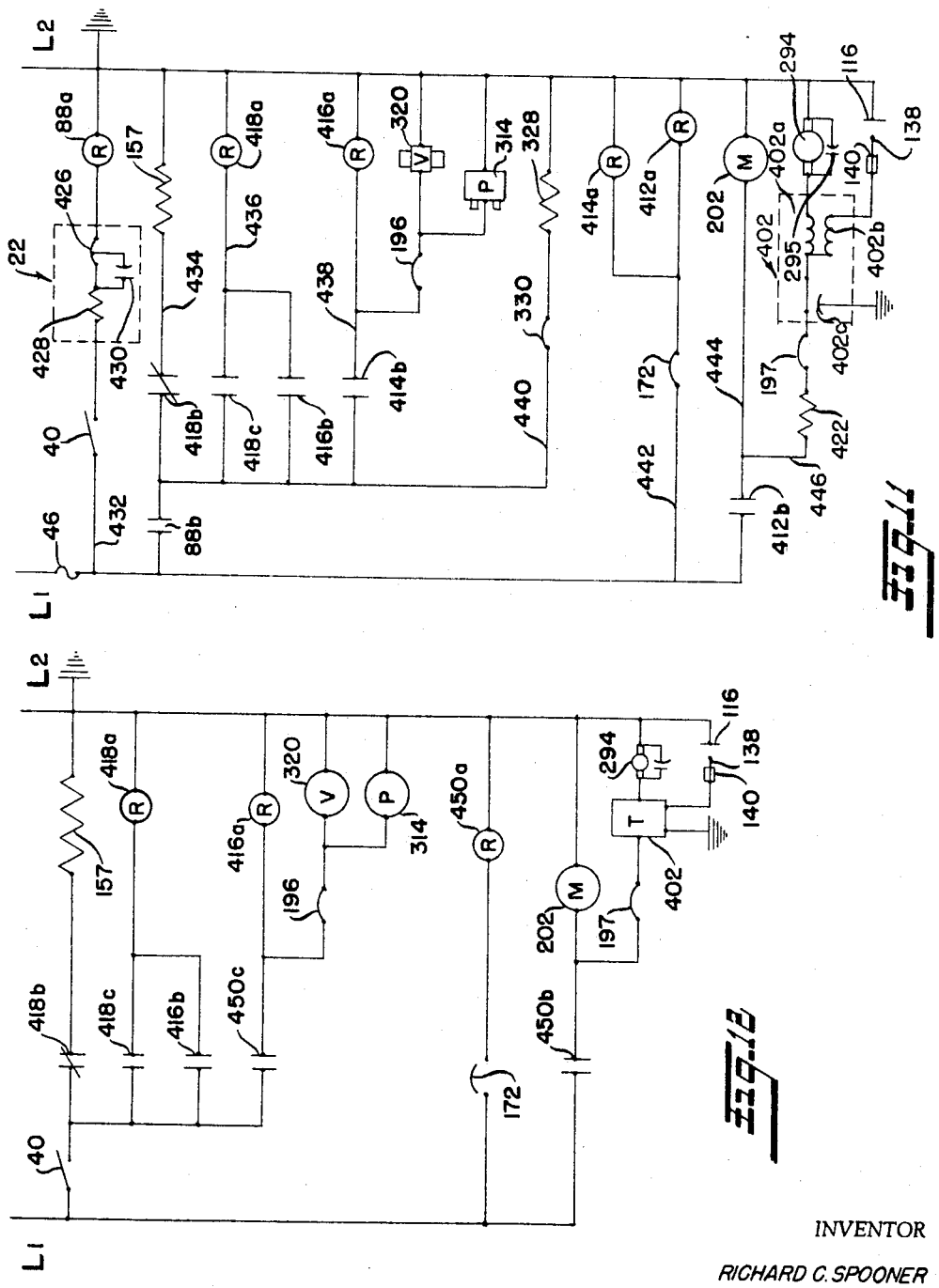

United States Patent Office 3,267,928
Patented August 23, 1966

3,267,928
HEATER
Richard C. Spooner, Fairview Park, Ohio, assignor to Hupp Corporation, Cleveland, Ohio, a corporation of Virginia
Filed Jan. 15, 1964, Ser. No. 337,898
5 Claims. (Cl. 126—110)

This invention relates generally to heating equipment, and more specifically to compact portable heating devices for generating heat from liquid fuel and distributing the heat within an enclosure such as a room, shelter, van or vehicle body, and to heater control means for preheating the fuel, starting combustion, preventing overheating, controlling the heater operation in accordance with the temperature of the space to be heated, and purging the combustion unit when combustion is cut off.

While the preferred heater of the present invention is capable of being used for any space heating requirement within its capacity, it is especially adaptable for heating vehicles, trailers or shelters, particularly those containing electronic or other delicate equipment which must be protected against freezing or maintained at a particular temperature.

Such installations are often housed in a small space not provided with permanent heating apparatus and in which unutilized space available for a heating unit is very limited. It is therefore essential that a heater for such service be very compact, rugged, suitable for operation under conditions of vibration and shock, free from interference with the performance of electronic apparatus, capable of being started and operated at any ambient temperature encountered, including extreme artic conditions and high altitudes. Such a heater, preferably, should be usable with a wide range of liquid fuels, be automatic in operation, and be capable of operation by any one of a variety of power sources, and must be free from electrical, fire or toxic gas hazards to human life.

In view of the foregoing, the objects of the present invention are to provide a novel heater unit:

(1) of compact, rugged, portable construction, for heating and circulating air.

(2) which can operate on any one of a variety of liquid fuels, such as leaded or unleaded gasoline, kerosene, diesel oil, jet fuel or light or heavy petroleum distillates.

(3) which will operate satisfactorily at ambient temperatures ranging down to −65° F. and at altitudes up to 10,000 feet above sea level.

(4) which will not create interference with the operation of electronic equipment.

(5) which will not be adversely affected by shock or vibration.

(6) with preheating means to facilitate starting and to allow use of less volatile fuels.

(7) with means to purge the combustion unit to prevent explosion or production of smoke after the burner is shut down.

(8) with safeguards against fire, explosion or shock hazards and means to prevent combustion products from entering the circulating air stream.

(9) operable on A.C. or D.C. power.

Other objects and advantages will be apparent from the following description, taken in conjunction with the attached drawings, in which:

FIGURE 1 is a front perspective view of the exterior of the heater and its control thermostat;

FIGURE 2 is a plan view of the heater with the top cover removed;

FIGURE 3 is an exploded rear perspective view of the heater casing and associated parts;

FIGURE 5 is a vertical section along line 5—5 of FIGURE 4;

FIGURE 6 is a fragmentary section, taken on line 6—6 of FIGURE 4;

FIGURE 7 is a vertical section through the combustion apparatus, taken alone line 7—7 of FIGURE 5;

FIGURE 9 is an exploded perspective view of the combustion apparatus parts;

FIGURE 10 is an exploded perspective view of the blower parts;

FIGURE 11 is an electrical schematic diagram of the one circuit; and

FIGURE 12 is an electrical schematic diagram of a modified circuit.

GENERAL

Figure 4:
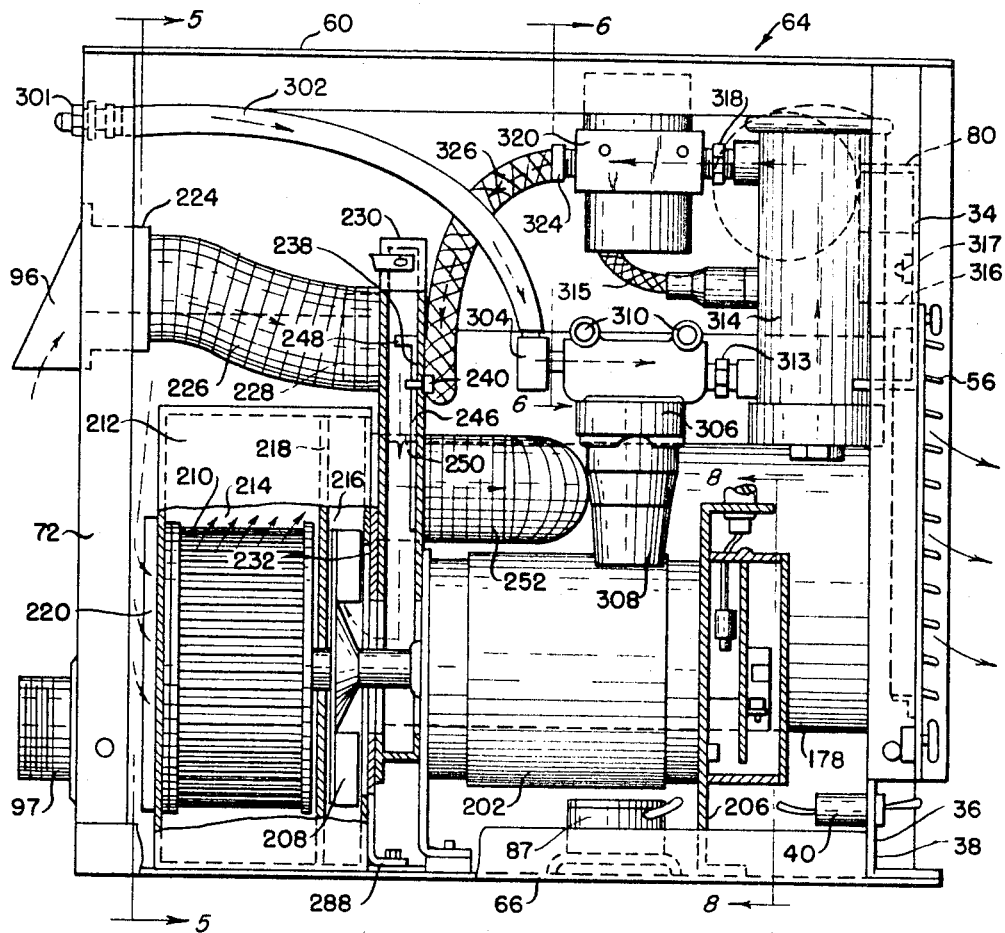
FIGURE 4 is a side elevation of the heater along line 4—4 of FIGURE 2, with the side panel removed.

As shown in the preferred embodiment of FIGURE 1, the heater of the present invention indicated generally at 20 comprises and includes, in combination, combustion assembly 100, blower assembly 200, fuel supply unit and electrical circuit all enclosed by casing 64, as hereinafter explained. Heater 20 preferably has an approximately cubic shape, about 12″ on a side.

Heater 20 is equipped with control thermostat 22 which is enclosed in casing 24 and has an adjustable control knob 26 which can be positioned relative to dial 28 for temperature selection. Cord 30 provides the electrical connection from thermostat 22 to heater 20 when connected by plug 32.

HEATER CASING

With reference to FIGURE 3, heater casing 64 includes a one-piece integral unit 65 composed of front panels 34 and 36, bottom 66 and side panel 67, which are flanged to form fastening ledges to which separate top, back and side panels are screw attached. Casing 64 also includes angles 68 and 70 which provide three additional fastening ledges for screw attachment of the separate top, back and side panels.

Panel 34 has a recessed face, the lower portion being further set back at control panel 36, which is covered by control plate 38 (FIGURES 1 and 3). Plate 38 and panel 36 have corresponding holes for receiving control switch 40, cap-covered D.C. power input receptacle 42 (supplied by cord 92 through fitting 90), cap-covered thermostat receptacle 44, fuse 46 and spare fuse 48.

Above panel 36, at the lower right-hand portion of panel 34 (FIGURE 1) is outlet grill 56 for discharging heated air. Grill 56 is preferably square and fastened by quarter-turn thumb screws 57 so that the grill can be located in any one of four positions, to permit the louvers to diect the issuing warm air up or down or to either side. Grill 56 also has gasket strips cemented to its underside along each edge.

Front panel 34 has a large hole 76 surrounded on the inside by collar 78 and located opposite grill 56.

Top panel 60 forms the top of casing 64 and has an integral circulating air grill 62 for admitting air to the heater interior and gasket strips 63 (FIGURE 3) cemented under the panel along each edge.

The back of casing 64 is covered by screw attached panel 72, which also has gasket strips cemented under the panel along each edge. Back panel 72 carries fuel line inlet connection hole 93, combustion air inlet hole 94 and combustion exhaust fitting hole 95. Hole 94 is covered by hood 96 while hole 95 has flanged outlet fitting 97 bolted over it on the outside, with gasket 98 sealing the joint therebetween.

The right side (as viewed in FIGURE 3) of casing 64 is covered by screw secured panel 74 which has gasket strips cemented under it along each edge.

Top panel 60 and side panel 74 are preferably square and interchangeable so that grill 62 may be on either the top (as shown) or the side. To make them easily removable, to provide access to the interior of heater, they may be fastened at each corner with quarter-turn screws 77.

Casing 64 carries support structure for combination assembly 100, blower assembly 200, fuel supply unit 300 and the electrical components. Fuel pump bracket 80 is welded on the inside of panel 34 near the right upper corner, as viewed in FIGURE 3. Fuel valve bracket 81 is welded to the inside of angle 70 (FIGURE 6). Ignition coil bracket 82 is welded on the inside of panel 34 near its upper left-hand corner as viewed in FIGURE 3. Four nuts 83 are attached to bottom 66 close to the corners. These nuts may be secured inside of the heater by the use of nut clips 84 (FIGURES 3 and 7), to secure heater 20 in the desired installed position, through square holes 85. Pad 86 on bottom 66 supports a relay, while pad 88 supports a blower brace, as hereinafter described.

COMBUSTION UNIT

The combustion unit assembly 100 is best illustrated in FIGURES 7 and 9. The burner and heat exchanger are essentially the same as that disclosed in application Serial No. 294,929, filed July 15, 1963. The burner incorporated in the present invention differs from that shown in said prior application, as particularized below, by the provision of means to adapt the burner to the blower system, preheating means making possible the use of less volatile fuels at very low temperatures and a control system well suited for use in the present heater when it is utilized in the type of environment set forth above.

The following forms no part of this invention, being generally part of application Serial No. 294,929, now abandoned, to which reference may be made for greater detail. Combustion chamber 102 incorporates cylindrical burner body 104, closed by welded wall 106 at one end and removable vaporizer assembly 108 at the other end. Assembly 108 comprises fuel supply tube 110, vaporizing plate 112, non-combustible wick 114, wick screen 116, wick holder 118, flame spreader 120 and three flame spreader supports 122, as illustrated in FIGURE 7.

Vaporizing plate 112 has an outer cylindrical flange 124 which fits on the outside of burner body 104. A central portion of plate 112 forms raised platform 126 within the burner and a corresponding depression 127 on the outside of plate 112. Plate 112 is fastened by nuts 145 to three spaced bolts 146 welded to the inside of the open end of body 104 and projecting through three mating holes 148 in plate 112.

Fuel supply tube 110 is welded at one end to the center of depression 127, to permit fuel to pass to the burner through hole 113 in plate 112.

Wick 114 is supported by overlying screen 116, both wick and screen being held in place by wick holder 118, which is a ring of Z-section welded to plate 112.

Flame spreader 120 is a circular metal disc, in the preferred embodiment being 1⅝ inches in diameter, about 1/32 inch thick and supported concentric with body 104 about 1½ inches from wick 114 by flame spreader supports 122 which are fastened to wick holder 118.

A cylindrical wall 142 surrounds and is spaced from body 104 opposite the primary and secondary combustion air holes 128 and 129, which are of predetermined size and relation for inducing ignition of fuel in body 104. Wall 142 is welded to body 104 at tapered end 143 and is closed at the open end by cover 144, preferably spaced about ½ inch from plate 112.

Cover 144 is held in place by four spaced bolts 150, which are welded to the outside of wall 142, by four apertured ears 152, welded at the outer edge of cover 144, and by nuts 154. Bolts 150 hold cover 144 in position with bead 156 against the open end of wall 142. Wall 142 and cover 144 are notched to clear tube 110.

Surrounding and spaced from body 104 at one end is heat exchanger 130 which comprises fins 131 and 132 for transfer of heat to circulated air blown over the surface of the fins and around body 104 and heat exchanger 130.

The interior of body 104 is in gas-flow communication with the interior of heat exchanger 130 through two connecting tubes 134, which in turn are in gas-flow communication with exhaust pipe 136. Exhaust pipe 136 has a horizontal section 137 and is offset by angular portion 174 to provide an outlet 176 which is aligned with and extends into outlet fitting 97, externally threaded to allow connection of an exhaust pipe.

In operation fuel on wick 114 is ignited by a spark arcing from the end of electrode 138 of spark plug 140 to wick screen 116, following which the hot ignited gases travel through tubes 134, heat exchanger 130, and exhaust conduit 136.

Burner components incorporated in the present invention not present in application Serial No. 294,929 will now be described. Placed within depression 127 is sheathed resistance coil 157 (FIGURES 5, 7 and 9), shaped as a pancake spiral. One end of the resistance wire in the coil is grounded through the sheath and ground strap 162 which is connected to one of bolts 146 and the ungrounded end 158 receives power through attachment to conductor 160 (FIGURE 9).

Coil 157 is held in place by aluminum cover 164 by notches fitting over bolts 146, between plate 112 and nuts 145. Cover 164 has a large V-shaped notch 168, through which ungrounded end 158 of coil 157 extends. Attached to cover 164 by screws 170 is burner thermostat 172, which has normally open contacts which close at a predetermined temperature, for example 250° F., to energize the fuel system and ignition system.

Surrounding combustion chamber 102 and heat exchanger 130 is sleeve 178, one end of which fits within annular collar 78. Sleeve 178 has hole 180 through which spark plug 140 extends. Collar 122 is welded between body 104 and wall 142 and is internally threaded to receive the threaded portion of spark plug 140.

Another hole 184 in sleeve 178 fits over combustion air inlet tube 186 which is welded to wall 142 (FIGURES 5 and 9). Spacer 188 fits about tube 186 and spaces sleeve 178 from wall 142, while clip 189 also fits about tube 186 to lock sleeve 178 in place. Hole 190 is an opening for fuel tube 110 which passes through bushing 191. Holes 192 and 193 are openings through which electric conductors extend, each hole having an insulating bushing 194. Screws 195 attach sleeve 178 to the blower assembly.

Overheat thermostat 196 and ignition cutout thermostat 197 are locked to sleeve 178 by clip 198 which is bolted to stud 199. Thermostat 196 is normally closed and opens at a predetermined temperature, for example, 200° F. Thermostat 197 is also normally closed and opens at a predetermined temperature, for example, 140° F.

BLOWER ASSEMBLY

Figure 8:
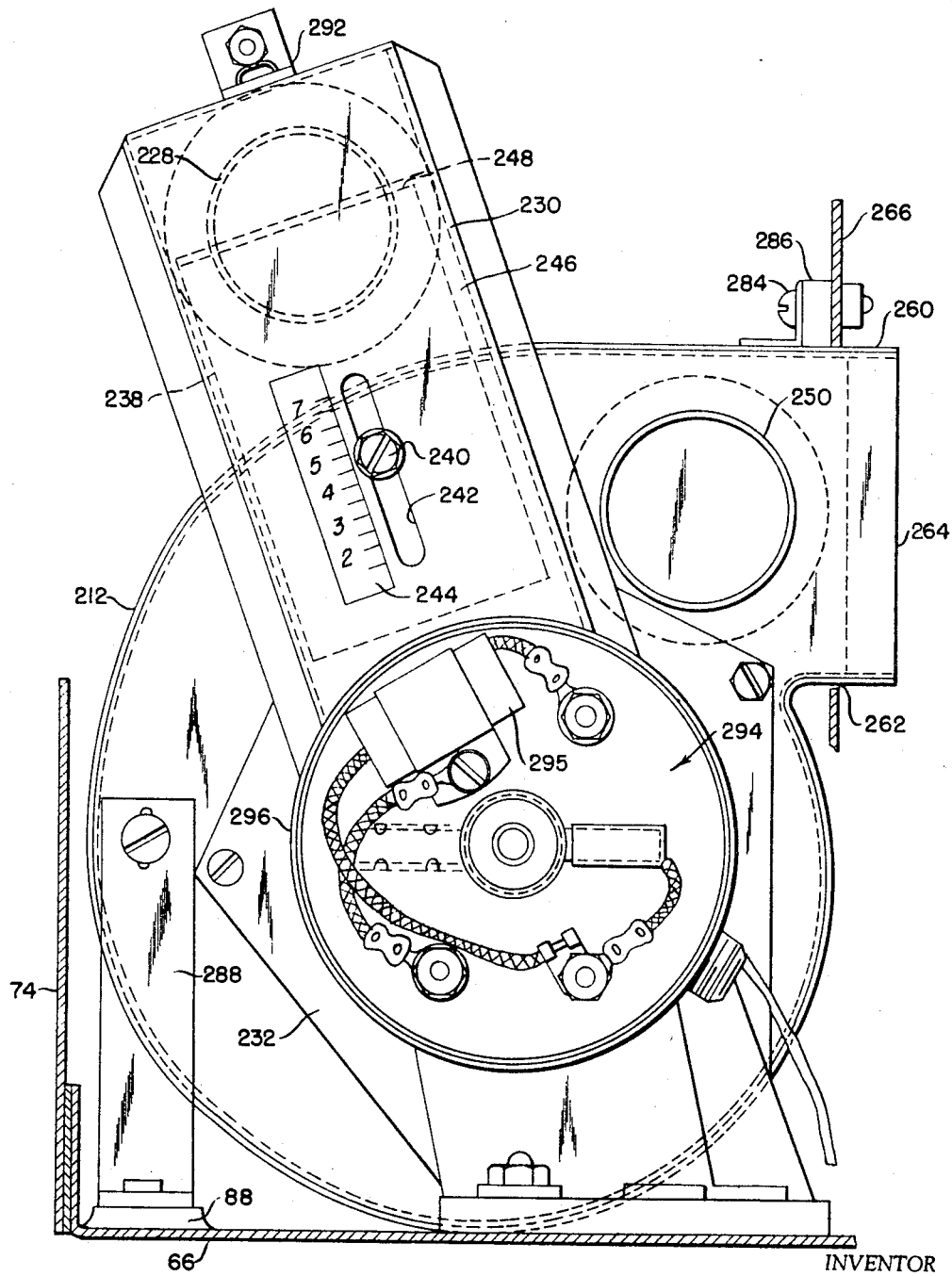
FIGURE 8 is a side elevation of the blower, along line 8—8 of FIGURE 4.

Blower motor 202, shown in FIGURES 4, 8 and 10, drives blower assembly 200, being supported by motor bolts 204 from bracket 206, which is attached to bottom 66.

Two blower wheels are mounted on the shaft 207 at one end of motor 202, i.e. paddle wheel 208 adjacent to the motor frame for furnishing combustion air and a squirrel cage wheel 210 at the end of the shaft for forcing circulating air through the heater where it is warmed and released through grill 56. Wheels 208 and 210, respectively, operate in compartments 214 and 216 of scroll 212 which is divided by partition 218 as shown in FIGURE 4. Scroll 212 is supported from bottom 66 by angle bracket 288 (FIGURE 8).

Combustion air is sucked by wheel 208 into the heater through hood 96, collar 224, hose 226, collar 228 and rectangular section duct 230 to blower scroll compartment 216 (FIGURE 4). Duct 230 fits between motor 202 and scroll 212 and is bolt attached at plate 232 to the wall of scroll 212 over opening 236 with cover 234 therebetween (FIGURE 10). Duct 230 is supported from bottom 66 by channel 290 and from back panel 72 by brace 292 (FIGURE 10).

Duct 230, as illustrated in FIGURES 4 and 8, contains sliding damper 238, held in position on duct 230 by screw 240 through slot 242. Damper 238 is formed as an angle with leg 246 bolted against the side of duct 230 under slot 242, and the other leg 248 extending across duct 230 where it restricts the opening through collar 228, the amount of restriction depending on its position as indicated on scale 244. Scale 244 permits accurate adjustment of damper 238 to control the amount of combustion air being supplied to accommodate different fuels or to compensate for changes in altitude.

With reference to FIGURE 4, combustion air circulated by wheel 208 leaves chamber 216 through collar 250, passes through flexible duct 252 and enters combustion unit 100 through collar 186 (FIGURE 5), duct 252 being slipped over collars 250 and 186 and secured by hose clamps 253 (FIGURE 10).

As shown in FIGURE 5, a deflector 254 is welded to wall 142 at 255 and has a tongue 256 which extends in front of the outlet of collar 186, and slopes toward burner body 104 causing the air entering the burner through holes 128 and 129 to swirl, thus providing an improved intimate mixture of the air with fuel vapor in body 104.

Fresh air is sucked into the heater through top grill 62 (FIGURES 1 and 3) into scroll 212 through screened fresh air inlet 220 by wheel 210 (see FIGURE 4).

Rectangular outlet 260 (FIGURES 5, 8 and 10) of scroll 212 is positioned in rectangular hole 262 of plenum chamber 264 (FIGURES 5 and 9). Partition 218 of scroll 212 is formed with leg 265 (FIGURE 10) perpendicular to outlet 260, which leg encloses the end of compartment 216 at outlet 260 so that only compartment 214 is in communication with plenum chamber 264.

Three sides of plenum chamber 264 (see FIGURES 5 and 9) are provided by the back panel 72, side panel 67 and bottom 66 of heater casing 64. The inlet side has vertical face 266 with hole 262 and sloping face 268, both faces having perpendicular flanges 269 for bolting to back panel 72 with gaskets cemented to the flanges. The outlet side 270 of plenum chamber 264 has a round hole 272 which is outwardly flanged at 274 to fit within sleeve 178, and has flanged periphery 276 which is spot welded to faces 266 and 268 and bolted to casing side panel 67. Plate 278 forms the top of plenum 264 and has flange 280 bolted to face 266 and flange 282 bolted to side 67 (FIGURE 5).

Scroll 212 is attached to face 266 by angle bracket 284 which is welded to outlet 260 and bolted to face 266 with gasket 286 therebetween.

Shaft 207 extends from motor 202 at both ends, the blower wheels being mounted at one end as above described and the other end driving circuit interrupter 294 (FIGURES 8 and 10) which is essentially the same as that disclosed in application Serial No. 54,402, now Patent No. 3,144,862, granted Aug. 18, 1964 to which reference may be made for details of construction.

Interrupter 294 incorporates a commutator which provides continuous contact with one brush and intermittent contact with another brush thus producing pulsation of current in a circuit through the brushes and commutator. A capacitor 295 (FIGURE 8) is connected in parallel with the interrupter and enclosed with it in cup 296, which is bolted to motor 202 by bolts 204. The open end of the cup is closed by cover 298, the cup and cover providing a shield against electrical interference.

FUEL SUPPLY UNIT

With reference to FIGURE 4, fuel is supplied to heater 20 from a fuel reservoir or the like (not shown) outside of the heater by a conduit (not shown) through fitting 301 which is secured by nut 302 to rear panel 72. In seriatim, fitting 301, hose 302, fitting 304, filter 306, and fitting 313 supply electric fuel pump 314 with fuel.

Filter 306 has a removable sediment chamber 308 and is bolted to support 311 and brace 312. Support 311 is attached to bracket 81, while brace 312 is connected to sleeve 178 (FIGURES 4 and 6).

Electric fuel pump 314 is connected to the electric circuit by shielded cable 315 and is cradled in pump bracket 80 which is welded to panel 34 by bolt fastened bracket 316.

Fuel leaves pump 314 through fitting 318 and enters combined pressure regulator and electric shutoff valve 320 which is bolted to panel 60 through bracket 81 and further supported by brace 311 (see FIGURE 6). Valve 320 incorporates pressure regulating means of the conventional diaphragm type, a solenoid valve which opens when energized, and an orifice which permits flow at a predetermined rate when the valve is open.

Electric resistance heater 328 (FIGURE 6) automatically warms valve 220 when the valve temperature drops to a predetermined value, for example 0° F., and is automatically shut off when the valve temperature rises to a predetermined value, for example 70° F., by thermostat 330. Thermostat 330 and heater 328 are attached by screws to opposite sides of valve 220. Fuel leaves valve 320 through hose fitting 324, which is connected by hose 326 to burner fuel conduit 110 (FIGURE 5).

ELECTRICAL COMPONENTS

The electrical apparatus of heater 20 includes previously described power input receptacle 42, thermostat receptacle 44, control switch 40, control relay 88, circuit interrupter 294, motor 202, spark plug 140, burner thermostat 172, overheat thermostat 196, spark cutout thermostat 197, fuel valve thermostat 330, preheater coil 157, valve heating coil 328, fuel valve 320, fuel pump 314, and fuse 46, which are electrically interrelated as shown in the wiring diagram of FIGURE 11.

A description of other electrical components, not previously described, follows.

Ignition coil 402 (FIGURES 2, 5, 7 and 11) is cylindrical and bolt-supported from panel 34 by bracket 82 and strap 404 (FIGURE 5). Shielded cable 408 connects the secondary winding of coil 402 to spark plug 140, and another shielded cable 410 (FIGURE 5) connects the primary winding of coil 402 with one of the brushes of interrupter 294.

Motor and ignition relay 412, fuel system relay 414, switching relay 416 and safety relay 418 (FIGURES 2 and 11) are automotive type relays which are bracket attached to the top of plenum chamber plate 278 (FIGURE 5). Resistor 422 (FIGURE 2) and terminal strip 424 are also located above plate 278.

All of the electrical components and circuits likely to cause radio interference are shielded.

ONE CIRCUIT

FIGURE 11 is one circuit diagram of the present invention. Power is supplied as 24 volt D.C. between lines L1 and L2, line L1 containing fuse 46, while L2 is grounded. Connecting line L1 to line L2 are lines 432, 434, 436, 438, 440, 442, 444, 446.

The circuit through line 432 includes control switch 40, thermostat 22, which provides resistance heater 428, heat activated switch 426 (the closing temperature of which is adjusted by knob 26, FIGURE 1), and capacitor 430 and control relay coil 88a.

The circuit through line 434 includes control relay normally open contact 88b, safety relay normally closed contact 418b, and preheater resistance coil 157.

The circuit through line 436 includes contact 88b, safety relay normally open contact 418c and switching relay normally open contact 416b, in parallel with each other and in series with safety relay coil 418a.

The circuit through line 438 includes contact 88b, fuel system relay normally open contact 414b and switching relay coil 416a, with a branch circuit in parallel with 416a including normally closed overheat thermostat 196 connected in series with fuel valve 320 and fuel pump 314, which are in parallel.

The circuit through line 440 includes contact 88b, normally closed fuel valve thermostat 330 and fuel valve heater 328.

The circuit through line 442 includes normally open burner thermostat 172 in series with fuel system relay coil 414a and with motor and ignition relay coil 412a, which are in parallel.

The circuit through line 444 includes, motor and ignition relay normally open contact 412b in series with motor 202.

The circuit through line 446 includes contact 412b in series with resistor 422, normally closed ignition thermostat 197, feed-through capacitor 402c, primary coil 402a of ignition coil 402, and interrupter 294; with ignition secondary coil 402b and spark plug 140 in parallel with coil 402a and interrupter 294.

CIRCUIT OPERATION

To begin operation switch 40 is closed causing thermostat 22 to close contacts 426, to energize coil 88a, closing contact 88b.

When contact 88b is closed, line 440 is energized, current then flows through normally closed fuel valve thermostat 330 and fuel heating coil 328, causing the latter to heat the fuel valve to a predetermined temperature before shutting off.

Line 434 is also energized when contact 88b is closed, causing heater 157 to warm the burner to starting temperature. When the burner becomes sufficiently hot, normally open burner thermostat 172 closes, energizing line 442 and fuel system and motor and ignition relay coils 412a and 414a, which close their contacts 412b and 414b.

Closing of contact 412b energizes line 444 and blower motor 202, starting the circulating air and combustion air blowers. Closing of 412b also energizes line 446 through resistor 422, thermostat 197, ignition coil primary 402a and circuit interrupter 294, resulting in a pulsating current, which induces a high voltage in the ignition coil secondary winding 402b producing a spark at the gap between electrode 138 and screen 116.

Closing of contact 414b energizes line 438 including switching relay coil 416a, and, through normally closed overheat thermostat 196, fuel valve 320 and fuel pump 314. This causes fuel to saturate the burner wick where it is ignited by the spark.

Energization of switching relay coil 416a also closes contact 416b which energizes line 436 and relay coil 418a. Energization of coil 418a, opens normally closed contact 418b, de-energizing preheater 157 and closes normally open contact 418c forming a holding circuit around contact 416b.

When the burner is sufficiently hot, ignition thermostat 197 will open, shutting off the spark, the fuel continuing to be ignited by thermocombustion. While the spark could be continued during burner operation, the life of the brushes of interrupter 294 is greatly extended by opening the ignition circuit.

If the heater becomes excessively hot, overheat thermostat 196 will open, closing the fuel valve and stopping the pump.

When operation of the heater is discontinued, either by thermostat 22 opening contact 426, or by manual opening of switch 40, coil 88a is de-energized and contact 88b opens. This breaks circuits through lines 434, 436, 438, and 440, cutting off power to the fuel valve, fuel pump and fuel valve heater, but continuing energization of lines 442 and 444, to keep the motor and blowers in operation until the burner is cool. At that time burner thermostat 172 will open, de-energizing relay coils 412a and 414a. De-energization of coil 412a opens contact 412b, stopping the blower motor, the L1–L2 circuit then being in condition so that the burner will recycle if switch 40 and thermostat 426 are closed.

If the burner flame accidentally goes out, as by running out of fuel, burner thermostat 172 opens, de-energizing coils 412a and 414a. This opens contact 412b discontinuing the spark, opens 414b shutting off the pump and valve, and opens contact 416a. Coil 418a remains energized through holding contact 418c and hence holds contact 418b open, preventing preheater 156 from being energized.

To restore the circuit to pre-starting condition, switch 40 or contact 426 must be open.

Modified circuit

The modified circuit shown in FIGURE 13 may also be used for purposes of economy or where moderate environment conditions exist. This circuit differs from the circuit shown in FIGURE 12 as follows.

Thermostat 22 and relay 88 are omitted; control being manual through switch 40; fuel valve heater 328 and fuel valve thermostat 330 are omitted, as they are required only when heavy fuel is to be used at very low temperatures; the two single pole relays 412 and 414 are replaced with one double pole relay 450 having coil 450a and normally open contacts 450b and 450c, which replace contacts 412b and 414b respectively; and resistor 422 is omitted, as it is required only when the impressed voltage is in excess of the voltage required for the spark coil primary. The modified circuit functions in a manner similar to the above-described operation of circuit of FIGURE 12.

Alternating current operation

Heater 20, designed for operation on 24 volt D.C., can also be used without alteration with alternating current of various voltages and frequencies, by providing a separate conventional transformer-rectifier unit (not shown) which first converts the alternating current to 24 volts, then rectifies it to the required 24 volt D.C.

Heaters for operation on alternating current can also be produced by eliminating interrupter 294, substituting an A.C. spark transformer for coil 402 and providing A.C. motor, pump, fuel valve and relays. Furthermore, an A.C. spark transformer and motor along with another transformer and a rectifier to provide D.C. power of suitable voltage for operation of the other D.C. components and controls may be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Heating apparatus adapted to be energized by an electrical source, comprising:
   (a) a liquid fuel burner,
   (b) electrically energized fuel supply means to deliver fuel to said burner,
   (c) electrically energized ignition means to ignite fuel within said burner,
   (d) combustion air supply means,
   (e) heat transfer air supply means,
   (f) an electric motor for driving said combustion air supply means and said heat transfer air supply means, (g) control switch means to start and stop operation of said burner, (h) a burner preheater which is energized when said switch means is closed to warm said burner, (i) a burner thermostat having normally open contacts which close when said burner thermostat reaches a predetermined temperature, said burner thermostat being in heat exchange relation with said burner, and (j) a control circuit incorporating first, second and third relay means, (1) said first relay means being energized when the contacts of said burner thermostat are closed to close a first normally open contact in circuit with said motor and ignition means, and to close a second normally open contact in series with said control switch means and in series parallel branch circuits through said fuel supply means and second relay means; thus energizing said motor, ignition means, fuel supply means and second relay means, (2) said second relay means including a normally open contact in series with said third relay means, said normally open contact closing and energizing said third relay means when said relay means is energized, (3) said third relay means incorporating;
(a) a normally closed contact in series with said control switch means and said preheater, and
(b) a normally open holding contact in parallel with the contact of said second relay means; whereby, when said third relay means is energized, said normally closed contact opens and deenergizes said preheater, and said normally open contact closes and keeps said third relay means energized, even if said first and second relay means later become deenergized.

2. Heating apparatus as set forth in claim 1, with;
(a) a fuel control in said fuel supply means, and
(b) a resistance heater and a fuel control thermostat each in heat transfer relation with said fuel control,
(c) said resistance heater and said fuel control thermostat being connected in said control circuit in series with each other and with said control switch means,
(d) said fuel control thermostat having contacts which close when the temperature of said fuel control drops below a predetermined minimum, and open when said temperature rises above a predetermined maximum.

3. Heating apparatus as set forth in claim 1, with;
(a) a duct for carrying air from said heat transfer air supply means to a point of discharge from said heater, said air being heated by said burner during its passage through said duct,
(b) an overheat thermostat in heat transfer relation to said duct adjacent to said point of discharge,
(c) said overheat thermostat being connected in said circuit in series with said fuel supply means and having normally closed contacts which open if the temperature of the thermostat exceeds a predetermined maximum to cut off the fuel supply to the burner.

4. Heating apparatus as set forth in claim 1, wherein
(a) said control switch means includes a control relay having normally open contacts and a coil connected in series with a control thermostat,
(b) said control thermostat being in heat exchange relation with space to be heated by said heating apparatus,
(c) said control thermostat having contacts which close when it is cooled below a predetermined minimum.

5. A space heater, including:
(a) a combustion unit;
(b) a blower unit; and
(c) a substantially cubical casing enclosing said combustion and blower units comprising;
(1) a frame having,
(a) three integral adjacent sides, each side joining the other two sides at approximately right angles and having substantially right-angled flanges along its non-integral edges, and
(b) three angle members, each angle member being attached to one of said integral sides and joining the other two angle members at approximately right angles,
(2) three removable sides, each secured to said flanges along two edges of each removable side and to said angle members along the two remaining edges of each removable side, at least two of said removable sides being interchangeable;
(3) a warm air grill with angled louvers releasably attached to one of said sides, said one side having a warm air discharge opening aligned with said combustion unit and said warm air grill, whereby said warm air grill may be positioned to issue warm air upward, downward or to either side;
(4) a recessed control panel attached to one of said sides; and
(5) fuel supply ingress means, combustion air intake and exhaust means and air intake means each carried by one of said sides.

References Cited by the Examiner
UNITED STATES PATENTS

| | | | |
|---|---|---|---|
| 1,990,827 | 2/1935 | Iler | 126—108 |
| 2,387,022 | 10/1945 | Hess et al. | 126—110 |
| 2,427,675 | 9/1947 | Holthouse | 126—110 |
| 2,432,314 | 12/1947 | Holthouse | 126—110 |
| 2,864,359 | 12/1958 | Baughn | 126—110 |
| 2,876,763 | 3/1959 | Hunter et al. | 126—110 |
| 2,990,877 | 7/1961 | Tramontini | 158—28 |
| 3,092,095 | 6/1963 | Hottenroth et al. | 126—110 |
| 3,158,192 | 11/1964 | Mizer | 158—28 |
| 3,159,201 | 12/1964 | Hottenroth et al. | 158—28 |

JAMES W. WESTHAVER, *Primary Examiner.*

UNITED STATES PATENT OFFICE
CERTIFICATE OF CORRECTION

Patent No. 3,267,928                                      August 23, 1966

Richard C. Spooner

It is hereby certified that error appears in the above numbered patent requiring correction and that the said Letters Patent should read as corrected below.

Column 3, line 10, for "combination" read -- combustion --; column 9, line 24, for "said relay" read -- said second relay --.

Signed and sealed this 1st day of August 1967.

(SEAL)
Attest:

Edward M. Fletcher, Jr.                                    EDWARD J. BRENNER

Attesting Officer                                               Commissioner of Patents